Nov. 29, 1927.

J. V. ROBINSON 1,650,850

AUTOMATIC TRAIN PIPE CONNECTER

Original Filed Dec. 9, 1919    2 Sheets-Sheet 1

Inventor
Joseph V. Robinson,
By his Attorneys
Foster, Freeman, Watson & Coit.

Nov. 29, 1927.  
J. V. ROBINSON  
1,650,850  
AUTOMATIC TRAIN PIPE CONNECTER  
Original Filed Dec. 9, 1919   2 Sheets-Sheet 2

Inventor  
Joseph V. Robinson,  
By his Attorneys  
Foster, Freeman, Watson & Coit Patented Nov. 29, 1927.

1,650,850

UNITED STATES PATENT OFFICE.

JOSEPH V. ROBINSON, OF NEW YORK, N. Y.

AUTOMATIC TRAIN-PIPE CONNECTER.

Application filed December 9, 1919, Serial No. 343,655. Renewed April 14, 1925.

My invention relates to improvements in automatic train pipe connecters and has for its object to provide an improved support in which the maximum spring compression is obtained with the minimum over all length of connecter, thus enabling sufficient spring compression to be carried to compensate for the wear on the coupling apparatus of the car, without producing a connecter of such length as to interfere with the outside hung brake rigging of the car. Another object of the invention is to provide an improved support in which the supporting flange bodily moves axially of the coupling head as such head is moved from the normal uncoupled position. Other novel features of my invention will appear from the following description and the accompanying drawing in which—

Figure 1:
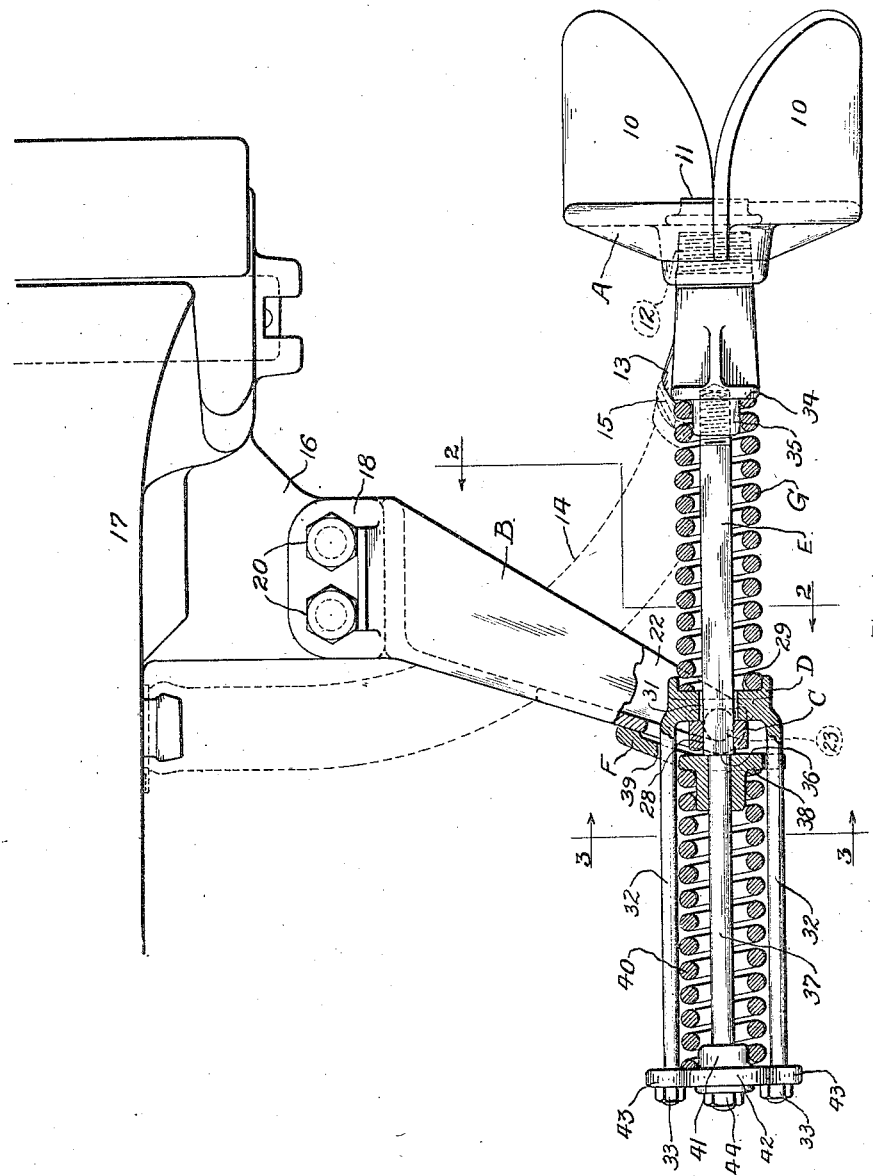
Figure 1 is a side view of my improved support showing some of the parts in a vertical section.
Figure 3:
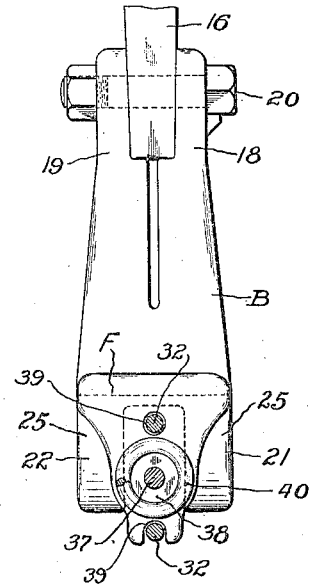

Figure 3 is a rear elevation of the bracket B and the flange F taken on the line 3—3 of Figure 1 and showing the projections 32 and 37 in section.

Figure 4:
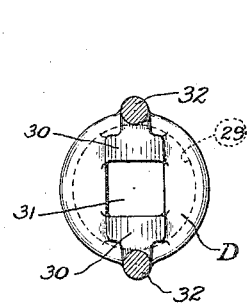

Figure 4 is a face view of the member D showing the bearing surfaces 30, and the projections 32 and 37.

Figure 2:
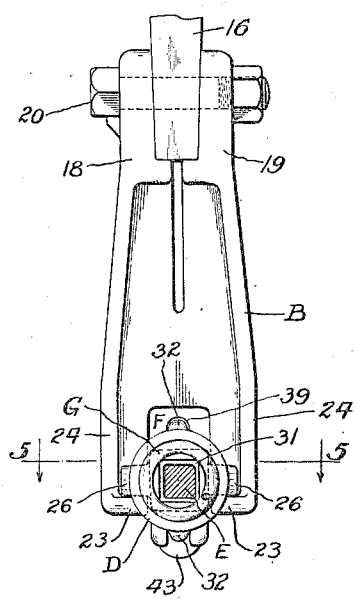
Figure 2 is a front elevation of the bracket B of my improved support taken on the line 2—2 of Figure 1 and showing the member E in section.
Figure 5:
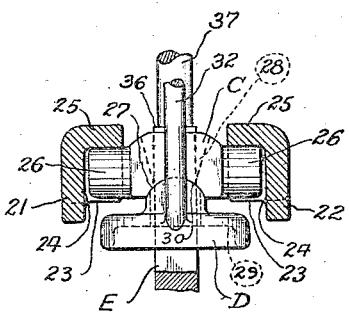
Figure 6:
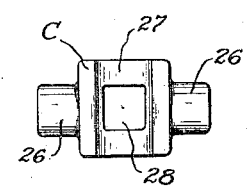

Figure 5 is a plan view taken on the line 5—5 of Figure 2 and showing the universal joint of my improvement in the assembled position. In this view the lower ends of the prongs 21 and 22 of the bracket B are shown in section, and Figure 6 is an elevation of the pivot bar C as viewed from the front.

Referring now to the drawings: Any suitable form of coupling head A having guiding prongs 10, and a suitable gasket 11 may be suitably secured to the forward threaded end 12 of the laterally diverging hollow conduit 13 of my improvement, which conduit has communication with the gasket 11 so that the fluid conducted from the train pipe of the car by a section 14 of the usual train pipe hose, is conveyed through the conduit 13 to the face of the gasket 11, the hose being secured to the conduit 13 in a satisfactory manner as by a standard form of fitting 15. My improved support is suspended from the lug 16 of the car coupler 17 by a bracket or base B which is U shape in cross section and terminates at its upper end in a pair of ears 18 and 19, which ears are securely clamped to the lug 16 as by bolts 20. The lower end of the bracket B terminates in a fork comprising members 21 and 22 spaced a substantial distance apart as shown particularly in Figures 2 and 5. The lower extremity of each of the prongs 21 and 22 terminates in a bearing 23 formed integrally with the side walls 24 and rear walls 25 of the prongs 21 and 22 as clearly shown in Figures 1, 2 and 5. Upon the bearings 23 I mount a pivot bar C comprising trunnions 26 and a vertically extending semi-circular concave bearing 27 having a rectangular opening 28 extending therethrough. On the bearing 27 I mount an abutment D having an annular seat 29 adapted to receive a spring. The abutment is provided with a pair of semi-circular convex bearing surfaces 30 adapted to mate with the complementary seat 27 of the pivot bar C, as shown particularly in Figures 1, 4 and 5. These surfaces 30 are positioned one above the other and are separated by a rectangular opening 31 which extends through the abutment D and is larger than, and is in alignment with the opening 28 of the pivot bar C, as shown. Integrally formed with the bearing surfaces 30, and extending rearwardly thereof to the rear of the bracket B, I provide suitably formed bars or projections 32 threadingly carrying a nut 33 at the rear end, as appears especially in Figure 1. Upon the rear face of the conduit 13 I provide an annular seat 34 and a threaded shank 35. Into the shank 35 I screw a connecting bar or member E which extends rearwardly of the conduit 13 through the openings 31 and 28 of the abutment B and the pivot bar C, and for a considerable distance beyond the rear face of the bracket or base B. That portion of the member E which extends through said openings is rectangular in cross section and fits loosely in the opening in the abutment D and snugly in the forward end of the opening 28 in the pivot bar C, said opening 28 flaring laterally toward the rear to permit of limited universal movement of member E, as shown in Figure 5. From a point immediately to the rear of the pivot bar C I form a shoulder 36 on the member E and from this shoulder rearwardly the member E is formed into a cylindrical extension or portion 37, as appears in Figures 1, 3 and 5. Upon the cylindrical portion 37 I slidably mount a flange or projection F having a perforated shank 38 through which the portion 37 extends and which also forms a seat for a spring. Above and below the pivot bar C I provide the flange F with openings 39 through which openings the projections or bars 32 of the member D extend whereby the flange F is maintained in its normal vertically disposed position. Surrounding the member E and mounted upon the seats 29 and 34 I mount one section of a buffer spring G, and upon the seat 38 of the flange F and surrounding the portion 37 of the member E and lying between the bars or projections 32 of the member D, I mount a section 40 of the spring G, the rear end of which section 40 is seated upon the seat 41 of an abutment or flange 42. The abutment 42 comprises a pair of oppositely spaced perforated ears 43 and a perforated shank which forms the seat 41, as shown in Figure 1. Through the shank 41 the cylindrical portion 37 extends while the bars 32 project through the openings in the ears 43. The abutment 43 is adjustable along the portion 37, and the bars 32, by means of the nuts 33 and 44, which operation will vary the compression of both sections of the spring G and will force the flange F against the rear side of the bracket B and maintain the coupling head A at the limit of its forward movement. It will be observed that the rear face of the bracket B is inclined forwardly towards the coupling head A, and that the upper portion of the flange F is correspondingly inclined so as to contact with the rear face of the bracket B. This arrangement produces a construction in which the flange F is slidably mounted upon the portion 37 of the member E and shifts bodily longitudinal of the said portion 37 as the coupling head A moves downwardly from the normal uncoupled position. The prongs 22 of the bracket span the pivot bar C, the abutment D, the member E, and the forward section of the spring G, while the member E is securely locked against rotation in the shank 35 in any suitable manner. This construction co-operates with the pivot bar C and the member E to prevent undue rotation of the coupling head A about its longitudinal axis, the member E being prevented from rotating in the pivot bar C by contact with the walls of the opening 28 in the pivot bar. It will be observed that the sections of the spring G operate to maintain the abutment D seated on its seat on the pivot bar C and to maintain the trunnions 26 of the pivot bar in their bearings 23 on the bracket B.

In operation the guides 10 of the coupling head A align opposing connecters and bring the gaskets 11 thereof into register. Further movement of the cars will shift the coupling head A rearwardly causing the member E to slide in the openings 31 and 28 of the abutment D and the pivot bar C. Through contact of the shoulder 36 with the flange F, the flange is by the said coupling operation, caused to move rearwardly away from the bracket B and against the tension of section 40 of the spring G. It will be observed that the pivot bar C is journaled on the bracket B for movement in the vertical plane only while the member D is journaled on the pivot bar C for movement in the horizontal plane only, and that the flange F does not resist upward movement of the coupling head A. The various parts of my improvement are, of course, so proportioned and arranged as to freely allow movement of the coupling head A to the various positions encountered in service.

What I claim as new and desire to secure by Letters Patent of the United States, is—

1. In an automatic train pipe connecter, the combination of a coupling head, a bracket provided with a bearing, a pivot device mounted on said bearing, said device being adapted to rotate in the vertical plane only and being provided with a perforated seat, a member mounted on said seat for rotation on the horizontal plane only, said member being provided with a seat for a spring and having also a perforation, an elongated member extending from said head through said perforations and carrying a flange, a spring seated on said spring seat in front of said bracket, and a second spring at the rear of said bracket and bearing against said flange.

2. In an automatic train pipe connecter, the combination of a coupling head, a bracket the lower end of which is forked, a bearing on each of the prongs of said fork, a member pivotally mounted on said bearing and having an opening, supporting means extending from said head through said opening and co-operating with said member to prevent undue rotation of said coupling head about its longitudinal axis, a projection slidably carried by said supporting means and normally engaging to the rear side of said bracket, a seat for a spring pivotally mounted upon said member, and a spring mounted in said seat and surrounding said supporting means and confined between said seat and said head and a second spring for pressing said projection against the rear side of the bracket.

3. In an automatic train pipe connecter, a bracket, a coupling head, a supporting member secured to said head and extending rearwardly past said bracket, means for supporting said member for universal movement relative to said bracket, a projection slidably mounted on said member at the rear of said bracket, and a spring surrounding said member at the rear of said bracket and bearing against said projection.

4. In an automatic train pipe connecter, the combination of a coupling head, a flexible support for said head comprising a bracket forked at its lower end and having on each prong of said fork a bearing, a member pivotally mounted on the bearings of said fork and extending across the fork and having an opening, a seat on said member, an abutment pivotally mounted on said seat and provided with rearwardly extending projections, means connected with said head and extending rearwardly thereof and having slidable engagement with said abutment and said member, a spring confined between said coupling head and said abutment for extending the head, a flange slidably mounted upon the rear end of said means and being provided with openings through which the projections of said abutment extend, a second abutment adjustably mounted with respect to said means and said projections, and a spring confined between said second abutment and said flange for maintaining said flange in engagement with said bracket and at the limit of its forward movement relative to said means.

5. In an automatic train pipe connecter, a bracket, a pivot device supported on the lower end of said bracket for pivotal movement on a substantially horizontal axis, said device having a seat on its front face, a member pivotally engaging said seat and extending rearwardly of said bracket, a head supporting member extending through the opening in said device, a coupling head carried by the front end of said supporting member, a flange carried by said supporting member at the rear of said bracket, and a spring arranged between said flange and the rearwardly projecting portion of said first named member.

6. In an automatic train pipe connecter, in combination, a bracket, a head supporting member pivotally mounted thereon, a portion of said member extending in front of the bracket and a portion to the rear thereof, a coupling head connected to the front portion of said supporting member, a flange slidably mounted on said supporting member in the rear of said bracket and a spring surrounding the rear portion of said supporting member for maintaining said flange in engagement with the rear face of the bracket.

7. In an automatic train pipe connecter, in combination, a bracket, a coupling head, a supporting member connected to said head and extending rearwardly past said bracket, means for supporting said head for universal pivotal movement relative to said bracket, said means including a pivot bar supported on said bracket and having an opening through which said supporting member extends, a projection slidably mounted on said supporting member at the rear of said bracket, a spring surrounding said supporting member at the rear of said bracket and bearing against said projection, and a spring surrounding said member in front of said bracket and bearing against said pivot bar.

8. In an automatic train pipe connecter, in combination, a bracket, a pivot device carried by the lower end of said bracket and arranged for movement about a horizontal axis, said device having a seat on its front face, a member pivotally engaging said seat and arranged for pivotal movement about a substantially vertical axis, a coupling head, a head supporting member extending rearwardly therefrom and passing through said device and said first named member and carrying a flange for bearing against the rear face of said bracket, a spring arranged between said first named member and said head, and a spring arranged between said flange and a rearwardly projecting portion carried by said first named member.

In testimony whereof I hereby affix my signature.

JOSEPH V. ROBINSON.